Patented Mar. 15, 1932

1,849,987

UNITED STATES PATENT OFFICE

HARRY C. MOORE, OF CHICAGO, ILLINOIS, ASSIGNOR TO ARMOUR FERTILIZER WORKS, OF CHICAGO, ILLINOIS, A CORPORATION OF NEW JERSEY

FERTILIZER MANUFACTURE

No Drawing.    Application filed December 11, 1928. Serial No. 325,389.

The present invention relates to improved fertilizers and their novel method of manufacture, and concerns more specifically the use of liquid anhydrous ammonia in the practice of the process by which they are produced.

Anhydrous ammonia, the largest use of which has been in connection with refrigeration, is a mobile liquid of boiling point minus 38° F. and with a vapor pressure at 77° F. of about ten atmospheres and at 122° F. of about twenty atmospheres.

In spite of these exceedingly unusual properties in a fertilizer material, I have discovered that such liquid anhydrous ammonia can nevertheless be used economically and satisfactorily directly in the manufacture of fertilizers in ordinary fertilizer mixing machines which are not especially designed to resist high pressures, if one or more of the fertilizer ingredients such as superphosphate, contains free acidity.

In fertilizer mixtures containing an acidic ingredient and large quantities of bulky organic materials, animal or vegetable, such as dried tankage, dried blood, cotton seed meal, etc., it is not always essential, in order to insure good physical condition of the fertilizer, to neutralize the free acidity, but in fertilizer mixtures containing relatively little or none of the bulky organic materials named, or other similar ones, it is necessary to a proper physical condition that the fertilizer mixture contain little or practically no free acid.

In the methods of neutralizing the free acidity of fertilizers in most common use at the present time, it is customary to add to the mixture a solid alkaline product such as cyanamid, slaked lime, or limestone, but these additions are not entirely satisfactory because the reactions of neutralization are slow and the distribution of the neutralizing agent in the small quantity used is often not complete and not uniform enough to prevent entirely many objectionable effects of the acidic condition, such as a loss of nitrogen on standing, and, under some conditions, the disintegration by the free acidity, of the bags, in which the fertilizer is packed for the trade.

Moreover, such a fertilizer must be cured over a period of time to obtain a proper physical state suitable for use in drilling machines.

I have discovered, however, that liquid anhydrous ammonia, when added to one or more fertilizer materials, at least one of which contains free acidity, in a standard fertilizer mixer, is absorbed by and combined with the acidic material, and, if added in the proper amount, will result in a mixture containing practically no free acid, the product possessing certain great advantages in the character of the fertilizer so obtained, such as a more concentrated fertilizer in a free-flowing condition, capable of being distributed in the soil by ordinary drilling machines, and in which the total plant foods of the ingredients are maintained practically unimpaired from the standpoints of both quantity and availability, that is to say, there is practically no loss of nitrogen or excessive loss of available phosphoric acid.

Such product is improved as to its odor, and the large decrease in the curing time of the fertilizer after mixing, and, under present economic conditions, there is a reduction in the cost of the fertilizer by employing the new process.

The neutralization of acidity in a fertilizer is always accompanied by a considerable heat of reaction which warms up the fertilizer mass often to quite a high temperature, the latter being undesirable in the manufacture of fertilizer as a high temperature favors the reversion of avaliable phosphate and also aids the reactions in which free acid acts on the nitrate, thus causing a loss of available nitrogenous plant food.

In certain processes of neutralization in which ammonia gas has been utilized as a neutralizing agent, this heat of reaction has been used to expel moisture from the fertilizer product because of the temperature developed.

In my novel process, by the use of liquid anhydrous ammonia, detrimental effects of high temperatures arising from neutralization are diminished due to the latent heat of vaporization of the liquid ammonia.

In carrying out my process of fertilizer manufacture, either a single acidic material, or a mixture of fertilizer materials at least one of which is acidic, such as a mixture of superphosphate, potassium chloride or sulphate, ammonium sulphate, sodium nitrate, and with or without the further addition of such organic materials as tankage, cotton seed meal, etc., are introduced into a standard fertilizer batch mixer, and the desired quantity of liquid anhydrous ammonia is run in while the mixing operation is taking place. The preferred type of mixer is one which has a fairly tight fitting sealing disc at the discharge end to prevent excessive dust loss, although no sealing disc is required on the intake end of the mixer. Due to the considerable vapor pressure which it has at ordinary temperatures, the liquid anhydrous ammonia is easily run from tank cars or other containers in which it is shipped or stored into suitable measuring or weighing tanks, from which the proper quantity can be discharged into the fertilizer mixer. I have found that, under these conditions, the neutralizing operation takes place in the usual short time of mixing, for example, a few minutes; that the resulting fertilizer is very uniform in composition; and that, on discharge from the mixer it cures in a very much shorter time than in older processes of fertilizer neutralization, and, when it is cured and disintegrated, it is found to be of a free-flowing condition suitable for use in ordinary drilling machines, and the plant food in the fertilizer is available to the plants in the soil. Such fertilizer can be packed in untreated bags, and it retains its desirable chemical and physical properties for a long period of time. It is generally preferred to add this liquid anhydrous ammonia in such quantity that the mixture will contain no free acidity and that not too much shall be added to cause reversion or loss to any substantial degree of any of the available fertilizer constituents.

In handling liquid anhydrous ammonia, the preferred practice is to add this material as weighed or measured charges, using suitable apparatus for this purpose and it is obviously necessary to keep the liquid, during weighing or measurement, under pressure to prevent loss of ammonia gas, such pressure not being released until the liquid anhydrous ammonia is added to the materials in the mixer.

The following is a typical formula containing nitrogen equivalent to about 6% ammonia ($NH_3$), 12% available phosphoric acid ($P_2O_5$) and 4% potash ($K_2O$):

1370 lbs. superphosphate (acid phosphate), 18% available $P_2O_5$
20 lbs. anhydrous $NH_3$ (liquid), 100% $NH_3$
330 lbs. sulphate of ammonia, 25% $NH_3$
110 lbs. nitrate of soda, 18% equivalent $NH_3$
170 lbs. muriate of potash, 50% equivalent $K_2O$ This process results in the production of a drier and more concentrated product than is obtained when ammonia liquor is used.

My new and improved process may be applied either to the formation of a mixed fertilizer, consisting of all of the ingredients of a complete plant food, or it may be applied to a single fertilizer material containing free acidity, and it can be used to great advantage with over-acidulated phosphates, which are usually sticky and in poor physical condition, or with double or triple superphosphates, and, in all cases, there are obtained the great advantages which I have enumerated, as compared to previous methods of neutralization of such acidic fertilizer materials.

When mixtures of superphosphate, liquid anhydrous ammonia and one or more additional fertilizer materials are desired, there are decided physical and chemical advantages in mixing them all together at substantially the same time rather than preparing first an ammoniated superphosphate and later mixing this with the other materials. A more uniform distribution of all of the ingredients is thereby obtained and such chemical reactions as occur between such materials as calcium superphosphate and the sulphates of ammonia and of potash proceed more rapidly.

Those skilled in this art will readily understand that the invention is not necessarily limited to the precise details presented above, and that minor changes may be incorporated without departure from the heart and essence of the invention as defined by the appended claims.

By a fertilizer containing no free acid is meant one which, when tested with methyl orange indicator in a water solution of the fertilizer, shows no acid reaction, this being a common practice in the fertilizer industry.

I claim:

1. The process of making fertilizer, consisting in mixing a ground solid commercial acid phosphate, another fertilizer compound, and anhydrous ammonia in liquid form, the amount of such ammonia being at least sufficient to neutralize the free acid but less in amount than that which would require added extraneous cooling of the mixture to prevent substantial reversion of the available phosphate to unavailable form.

2. The process of making mixed fertilizer, consisting in mixing a ground solid commercial acid phosphate, a nitrate, and anhydrous ammonia in liquid form, the amount of such ammonia being at least sufficient to neutralize the free acid but less in amount than that which would require added extraneous cooling of the mixture to prevent substantial reversion of the available phosphate to unavailable form.

3. The process of making mixed fertilizer, consisting in mixing a ground solid commercial acid phosphate, a fertilizer potassium salt, and anhydrous ammonia in liquid form, the amount of such ammonia being at least sufficient to neutralize the free acid but less in amount than that which would require added extraneous cooling of the mixture to prevent substantial reversion of the available phosphate to unavailable form.

4. The process of making mixed fertilizer, consisting in mixing for a few minutes only and at substantially atmospheric pressure a ground solid commercial acid phosphate, a nitrate, and anhydrous ammonia in liquid form, the amount of such ammonia being at least sufficient to neutralize the free acid but less in amount than that which would require added extraneous cooling of the mixture to prevent substantial reversion of the available phosphate to unavailable form.

In witness whereof I have hereunto set my hand.

HARRY C. MOORE.